(12) United States Patent
Kern et al.

(10) Patent No.: US 9,415,882 B2
(45) Date of Patent: Aug. 16, 2016

(54) OVERHEAT SENSOR SYSTEM (71) Applicant: Kidde Technologies, Inc., Wilson, NC (US)

(72) Inventors: Mark T. Kern, Goleta, CA (US); Ken Bell, Raleigh, NC (US); Aaron Stanley Rogers, Surf City, NC (US)

(73) Assignee: Kidde Technologies, Inc., Wilson, NC (US)

( * ) Notice: Subject to any disclaimer, the term of this patent is extended or adjusted under 35 U.S.C. 154(b) by 0 days.

(21) Appl. No.: 14/285,304

(22) Filed: May 22, 2014

(65) Prior Publication Data

US 2015/0336681 A1  Nov. 26, 2015

(51) Int. Cl.
| | |
|---|---|
| *G08B 17/12* | (2006.01) |
| *B64D 45/00* | (2006.01) |
| *G01J 5/00* | (2006.01) |
| *G01J 5/02* | (2006.01) |
| *F01D 17/08* | (2006.01) |
| *F01D 21/00* | (2006.01) |
| *F01D 21/12* | (2006.01) |
| *A62C 3/08* | (2006.01) |

(52) U.S. Cl.
CPC . *B64D 45/00* (2013.01); *A62C 3/08* (2013.01); *F01D 17/085* (2013.01); *F01D 21/003* (2013.01); *F01D 21/12* (2013.01); *G01J 5/0014* (2013.01); *G01J 5/025* (2013.01); *B64D 2045/009* (2013.01); *B64D 2045/0085* (2013.01); *F05D 2260/80* (2013.01); *F05D 2260/83* (2013.01)

(58) Field of Classification Search
CPC ........ G08B 17/00; G08B 17/02; G08B 17/12; G08B 17/117; B64D 45/00; B64D 2045/0085; B64D 2045/009; F01D 21/12
USPC ......... 340/540, 577, 578, 584, 588, 933, 945; 250/342, 353; 432/2, 32; 169/52, 56, 169/60, 70
See application file for complete search history.

(56) References Cited

U.S. PATENT DOCUMENTS

| | | | |
|---|---|---|---|
| 5,059,953 A | * | 10/1991 | Parsons et al. ................. 340/578 |
| 2003/0076488 A1 | * | 4/2003 | Arnold ....................... 356/152.1 |
| 2007/0044979 A1 | | 3/2007 | Popp et al. |
| 2013/0079955 A1 | | 3/2013 | Masiello et al. |

OTHER PUBLICATIONS

Extended European Search Report dated Oct. 23, 2015 in European Application No. 15167573.3.

* cited by examiner

*Primary Examiner* — Hung T Nguyen
(74) *Attorney, Agent, or Firm* — Snell & Wilmer L.L.P.

(57) ABSTRACT

An overheat sensor system is provided. A controller may create an aircraft temperature profile and may compare temperature sensor data to the profile. The system may provide an output indicating temperatures or fires.

10 Claims, 4 Drawing Sheets

OVERHEAT SENSOR SYSTEM

FIELD

The present disclosure relates to sensor systems and, more specifically, to an overheat sensor system to improve temperature monitoring of devices under observation.

BACKGROUND

Presently, sensor systems are utilized to monitor temperature in an aircraft, but these sensors are typically only effective at discrete temperature ranges. Moreover, present temperature sensor systems retain a set shape adapted to each location under observation. Thus, an aircraft may comprise many differently shaped temperature sensor systems, which increases part count.

SUMMARY

Systems and methods disclosed herein may be useful in infrared overheat sensor systems. An overheat sensor system is provided. The system may have a controller having a processor and a tangible, non-transitory memory. The system may also have a sensor bus in logical communication with the controller, and a first sensor in logical communication with the controller via the sensor bus and configured to receive first infrared radiation from a first location under observation. The controller may be configured to take a first action in response to a first indication that the first infrared radiation from the first location under observation exceeds a first threshold.

A method for overheat sensing is provided. The method may include toggling, by an overheat sensing controller, a controller mode to a calibration mode.

The calibration mode may include receiving by the overheat sensing controller, an aircraft mode, receiving, by the overheat sensing controller, a first sensor temperature indication, and receiving, by the overheat sensing controller, a second sensor temperature indication. The calibration mode may further include building, by the overheat sensing controller, an aircraft profile. The aircraft profile may include the first sensor temperature indication, the second sensor temperature indication, and the aircraft mode. The method for overheat sensing may include toggling, by the overheat sensing controller, the controller mode to an operation mode.

The operation mode may include receiving, by the overheat sensing controller, the aircraft mode, receiving, by the overheat sensing controller, a third sensor temperature indication, and receiving by the overheat sensing controller, a fourth sensor temperature indication. The operation mode may further include processing the third sensor temperature indication and the fourth sensor temperature indication. The processing may include comparing the third sensor temperature indication and the aircraft mode to the aircraft profile and comparing the fourth sensor temperature indication and the aircraft mode to the aircraft profile. Finally, the operation mode may include providing an output to an output device in response to the processing.

BRIEF DESCRIPTION OF THE DRAWINGS

The subject matter of the present disclosure is particularly pointed out and distinctly claimed in the concluding portion of the specification. A more complete understanding of the present disclosure may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, electrical, chemical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. As used herein, phrases such as "make contact with," "coupled to," "touch," "interface with" and "engage" may be used interchangeably.

Figure 1:
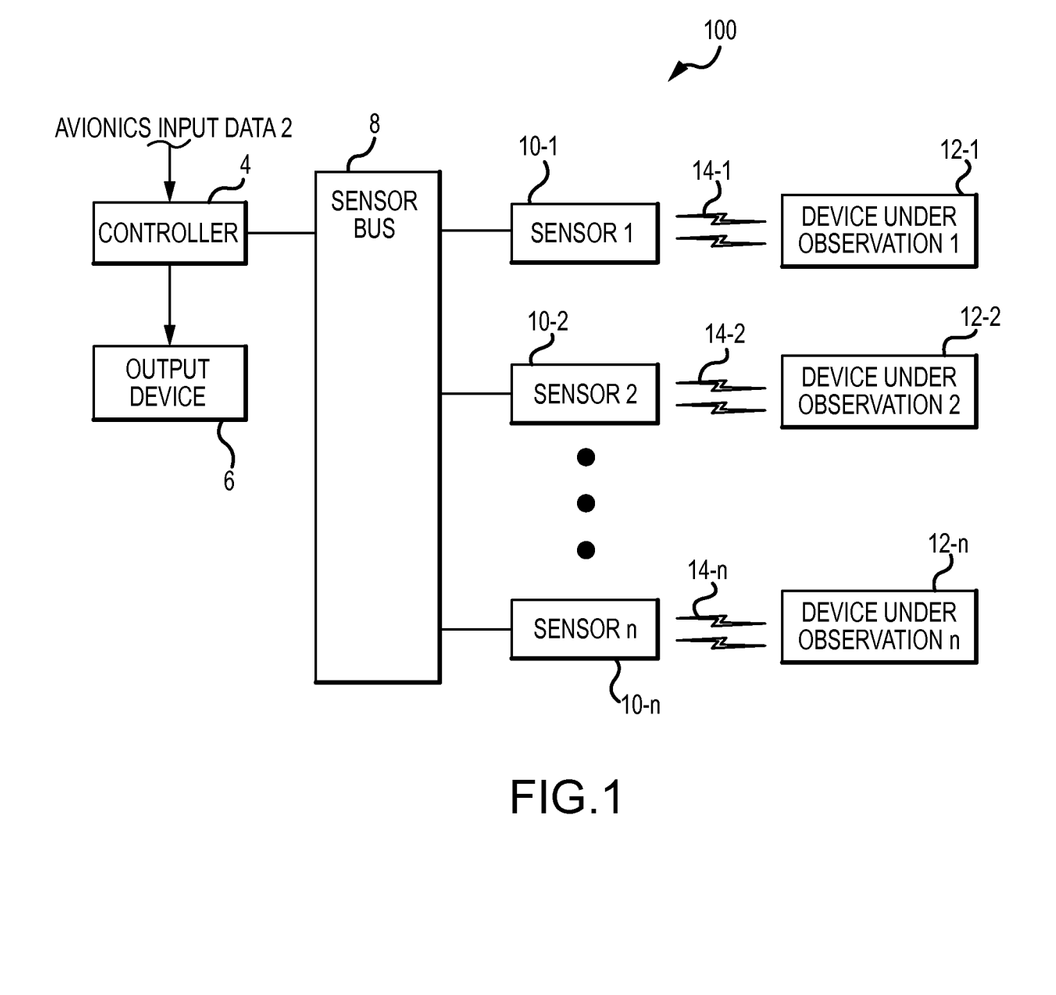
FIG. 1 illustrates an exemplary infrared overheat sensor system.

With reference to FIG. 1, an overheat sensor system 100 may comprise a controller 4, an output device 6, a sensor bus 8, and a plurality of sensors 10. In various embodiments, the plurality of sensors 10 comprises a first sensor 10-1, a second sensor 10-2, and any number of sensors 10-$n$, although in other embodiments, an overheat sensor system 100 comprises a single sensor.

A controller 4 may comprise a processor and a tangible non-transitory memory. A controller 4 may be in logical communication with a sensor bus 8. Logical communication may include electrical, magnetic, radio frequency, and/or optical communication. Logical communication may facilitate the transmission of signals, whether analog or digital, between two or more components. The controller 4 may receive data from the sensor bus 8 and perform operations on the data. Similarly, the controller 4 may receive avionics input data 2. The controller 4 may receive avionics input data 2 on an input separate from sensor bus 8. However, the controller may receive alternatively, or additionally receive avionics input data on the sensor bus, for example, when the sensor bus is a general aircraft data bus such as a bus shared by multiple systems and components. The controller 4 may perform operations on the sensor data and the avionics input data and/or store the sensor data and the avionics input data and may provide output data to an output device 6 in response to processing the sensor data and the avionics input data.

An output device 6 may be in electrical, magnetic, radio frequency, and/or optical communication with the controller 4 to provide a human readable output and/or a machinereadable output based on the data provided by the sensor bus 8 and the avionics input data 2 to the controller 4. In various embodiments, the output device 6 may comprise a maintenance panel on an aircraft, for example, a maintenance data display unit externally mounted on the aircraft for access by ground crews. The output device 6 may comprise a cockpit panel on the aircraft, for example, a crew-alert system (CAS), or an engine-indication and crew-alert system (EICAS), or a multifunction display (MFD) or any other output device panel. Moreover, the output device 6 may comprise a portable device (alone, or in addition to a cockpit panel and/or a maintenance data display unit), such as a receiver or transceiver that could be carried by maintenance personnel, for example, a maintenance data receiver in electrical, magnetic, radio frequency, and/or optical communication with controller 4. The output device 6 may comprise a fire extinguisher system, a circuit breaker control system, a hydraulic valve system, and/or any other aircraft system or safety device.

Figure 3:
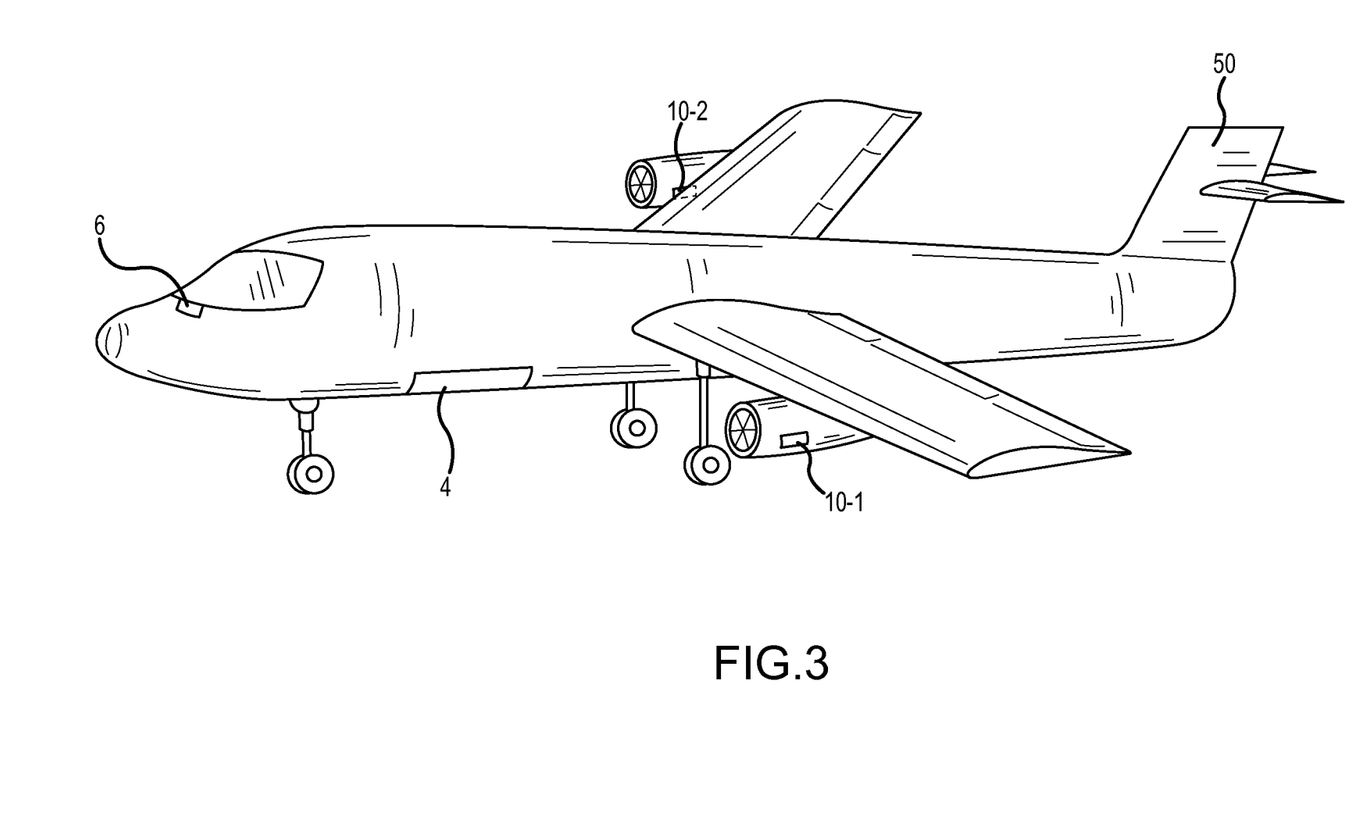
FIG. 3 illustrates various aspects of an overheat sensor system installed in an aircraft.

With reference to FIGS. 1 and 3, the output device 6 may be located in the cockpit of an aircraft 50. Output device 6 may comprise a graphical depiction of an aircraft with zones corresponding to each of sensors 10. The zones may be displayed in a selected color in response to the output data. For example, a zone wherein the sensor 10-1 senses a temperature less than a threshold may be illuminated in green, a zone wherein the sensor 10-1 senses an elevated temperature may be illuminated in yellow, and a zone wherein the sensor 10-1 senses a dangerous temperature may be illuminated in red. Similarly, a zone wherein the sensor 10-2 senses a temperature less than a threshold may be illuminated in green, a zone wherein the sensor 10-2 senses an elevated temperature may be illuminated in yellow, and a zone wherein the sensor 10-2 senses a dangerous temperature may be illuminated in red. The output device 6 may depict any number of zones in response to any number of sensors. Output device 6 may comprise an aural annunciator whereby crewmembers may be alerted of a temperature excursion or other information or events. For example, an aural annunciator may output chimes, tones, may speak temperatures and/or spoken word alerts, and/or may provide other information. Output device 6 may comprise a tangible non-transitory memory whereby output data may be logged and/or a transmitter whereby output data may be transmitted to an offboard system, for example a satellite transceiver or a ground station transceiver whereby output data may be transmitted. Moreover, any arrangement or configuration of controller 4, and output device 6 may be contemplated in accordance with the principles disclosed herein.

A sensor bus 8 may comprise a logical bus and/or an electrical bus. The sensor bus 8 may be in logical communication with a plurality of aircraft systems, including sensors 10-1, 10-2, and 10-n. For example, a plurality of aircraft systems, including sensors 10-1, 10-2, and 10-n may be wired into an electrical bus. Sensor bus 8 may also comprise a logical bus. The sensor bus 8 may comprise a message-based protocol and/or various logical layers and device addresses whereby the controller 4 may interact jointly and/or individually with various sensors. Controller 4 may transmit and receive messages with sensor 10-1 by addressing messages to a bus address associated with sensor 10-1. A controller 4 may take a first action in response to a first indication received from a first sensor 10-1, and a controller 4 may take a second action in response to a second indication received from a second sensor 10-2. Thus, the controller 4 may take different actions in response to different signals and/or different sensors. Controller 4 may transmit messages to sensors 10-1, 10-2, and 10-n in relative simultaneity by addressing messages to a broadcast address, or to multiple sensors. Thus, sensor bus 8 may comprise a CAN bus (controller area network bus). Alternatively, sensor bus 8 may comprise an ACARS bus (aircraft communication addressing and reporting system bus) or may comprise a bus that is compliant with Aeronautical Radio, Incorporated (ARINC) reference standards. Furthermore, sensor bus 8 may comprise an ARINC 825 standard compliant bus, or may comprise any ARINC 800 series standard compliant bus or ARINC 700 series standard compliant bus or may comprise any other bus architecture.

In various embodiments, sensor bus 8 may comprise a combination of multiple busses, for example, in the event that there are more devices than can be addressed on a single bus. Sensor bus 8 may be a CAN bus capable of addressing 128 devices. Thus, in the event that more than 128 devices are sought to be addressed on a CAN bus, controller 4 may be in communication with multiple busses.

An overheat sensor system may comprise avionics 3 whereby avionics input data 2 is provided to controller 4. For example, avionics 3 may comprise an aircraft data bus, a global positioning system ("GPS"), a full authority digital engine control ("FADEC"), an electronic engine controller ("EEC"), an engine control unit ("ECU"), a flight computer, an airspeed indicator, an altimeter, a weight-on-wheels ("WOW") switch, a parking brake position switch, and/or any other aircraft system, instrument, or data source whereby the mode of flight of the aircraft may be determined.

A controller 4 may receive avionics input data 2 from avionics 3. Avionics input data 2 may comprise data indicating the mode of flight of the aircraft. For example, avionics input data 2 may comprise data indicative of whether an aircraft is parked, taxiing, taking off, climbing, cruising, descending, and/or landing. Avionics input data 2 may comprise airspeed data, ground speed data, engine operation data. Engine operation data may include variables such as revolutions per minute ("RPM"), throttle position, fuel flow, and any other characteristic. In this manner, the controller 4 may be aware of the context in which sensors 10 are sensing the infrared radiation 14 (e.g., the temperature of locations under observation 12). Thus, controller 4 may provide situationally tailored information to output device 6. For example, an engine combustion chamber may be expected to be hotter at a high throttle setting than at a low throttle setting. Thus, if controller 4 receives an indication of high temperature at a low throttle setting, a different output may be provided than if the controller 4 receives an indication of the same high temperature at a high throttle setting, because the same temperature may be normal at a high throttle setting and may not be a cause for concern at a high throttle setting. Thus, the controller 4 may consider the context (provided by avionics input data 2) in which the sensor data (available on sensor bus 8) is collected. Because a given temperature may be normal at a high throttle setting and may be abnormal at a low throttle setting, different output may be indicated.

A sensor 10 may comprise a temperature-sensing element. For instance, the sensor 10 may comprise a single temperature-sensing element configured to detect infrared radiation with a wavelength between 700 nm and 1 mm. In various embodiments, the element may detect infrared radiation across a range of wavelengths, for example, infrared radiation of various wavelengths lying within the range between 700 nm and 1 mm. In various embodiments, the single temperature-sensing element has a passband of 5 microns longpass. The temperature-sensing element may detect a level of infrared radiation and a temperature may be determined. Alternatively, or in addition, the temperature-sensing element may detect a rate of change of infrared radiation level over time. A rate of change of infrared radiation level exceeding a threshold may indicate that sensor 10 detects a fire, while a level of infrared radiation that exceeds a threshold may indicate that sensor 10 detects an excessive temperature. The infrared radiation level can be mapped to a temperature by the sensor 10, or by the controller 4. A positive correlation exists between the magnitude of the infrared radiation and the temperature of the radiation source, such as a location under observation. Similarly, the magnitude of infrared radiation may increase and decrease over time. In various instances, a rapid increase in the magnitude of infrared radiation may indicate a fire (e.g., combustion). The rapid increase may be detectable before the magnitude of the infrared radiation exceeds a threshold, or may indicate that the temperature change has occurred more rapidly than expected in light of the heat capacity of a material and the nominal heat transfer between materials in and surrounding the location under observation 12 during normal operation.

Sensor 10 may comprise a temperature sensing element and fire sensing element. The temperature sensing element may comprise a long wavelength infrared radiation sensing element, and the fire sensing element may comprise a shorter wavelength infrared sensing element. In various embodiments, sensor 10 comprises a sensing element configured to sense short wavelength infrared radiation (e.g., wavelengths slightly longer than the visible spectrum) and another sensing element configured to sense long wavelength infrared radiation (e.g., wavelengths significantly longer than the visible spectrum). Thus, sensor 10 may comprise a shorter wavelength infrared sensing element and a long wavelength infrared sensing element.

A fire may be indicated, and/or a temperature may be determined. The shorter wavelength infrared sensing element may detect a level of infrared radiation and/or a rate of change of infrared radiation level over a given time period. Similarly, the long wavelength infrared sensing element may detect a level of infrared radiation and/or a rate of change of infrared radiation level. A rate of change of infrared radiation level exceeding a threshold may indicate that sensor 10 detects a fire (e.g., combustion), while a level of infrared radiation that exceeds a threshold may indicate that sensor 10 detects an excessive temperature. If the long wavelength infrared sensing element detects a threshold level of infrared radiation, and the shorter wavelength infrared sensing element does not detect a threshold level of infrared radiation, an excessive temperature (but not a fire) may be indicated. If either sensing element, but particularly the short wavelength sensing element detects a rate of change of infrared radiation level exceeding a threshold, a fire may be indicated. Sensor 10 may be capable of accurately and precisely sensing temperatures of a location under observation 12 while the sensor 10 itself experiences ambient environmental temperatures from −55° Celsius (−67° F.) to 125° Celsius (257° F.). Alternatively, the sensor 10 may be capable of accurately and precisely sensing temperatures of a location under observation 12 while the sensor 10 itself experiences any ambient environmental temperature.

In other instances, the sensor 10 comprises an acoustical sensor, for example, to detect events such as a bleed air duct fragmentation, wherein flying debris may impede the operation of other sensors 10 that comprise a sensing element configured to sense infrared radiation.

Still furthermore, the sensor 10 may comprise a spectral scanning device. In various embodiments, the sensor 10 may comprise a spectral scanning device having a single element detector; though in further embodiments, the spectral scanning device may have multiple elements. The spectral scanning device may scan a spectrum having a wavelength of 2 microns to 10 microns. The sensor 10 comprising the spectral scanning device may further comprise a tangible, non-transitory memory wherein the shape of a black body curve of the location under observation 12 is stored. The spectral scanning device may accurately and precisely sense temperatures of a location under observation 12 emitting a variety of wavelengths of infrared radiation. Alternatively, the sensor 10 may comprise a thermocouple, a strain gage, or any other sensor. Thus, various different types of sensor 10 may be implemented together.

Still furthermore, sensors 10 may comprise interrupt triggering sensors. For example, the sensors 10 may send data via sensor bus 8 to controller 4 when a change in temperature exceeds a temperature change threshold and/or when a rate of change of temperature $$\left(e.g., \frac{\Delta \text{Temperature}}{\Delta \text{Time}}\right)$$

exceeds a temperature rate change threshold. When a rate of change of temperature exceeds a temperature rate change threshold, a fire may be indicated. Alternatively, the sensors 10 send data via sensor bus 8 to controller 4 when a temperature value exceeds a fixed temperature threshold.

Alternatively, sensors 10 may comprise polled sensors. For example, the sensors 10 may send data via sensor bus 8 to controller 4 in response to interrogation by the controller 4.

Moreover, in various other embodiments, sensors 10 comprise timed sensors. For example, the sensors 10 may periodically send data via sensor bus 8 to controller 4, for example, at 1 second intervals (+/−0.5 sec), or at 0.1 second intervals (+/−0.05 sec), or at 0.01 second intervals (+/−0.005 sec), or at any interval. Furthermore, the interval may change based on the measured temperature, or rate of temperature change, or any other relevant factor.

Sensors 10 may comprise a combination of various features of various embodiments, for example, a sensor 10 may comprise interrupt triggering and/or may comprise polled triggering and/or may comprise timed triggering. A sensor 10 may periodically send data via sensor bus 8 to controller 4, for example, at 1 second intervals (+/−0.5 sec), or at 0.1 second intervals (+/−0.05 sec), or at 0.01 second intervals (+/−0.005 sec), and additionally at other times according to interrupt triggering, or according to polling requests. The rate at which sensors 10 send data via sensor bus 8 to controller 4 may be varied in response to the measured temperature, or rate of temperature change. For example, if a rapid temperature increase is detected, the rate at which the timed triggering, or the polled triggering occurs may be increased to improve detection of rapid fluctuations in temperature until the rate of change of temperature slows.

Still furthermore, sensors 10 may provide an infrared radiation ("IR") level to controller 4 and the controller 4 may process the IR level to determine a temperature. Controller 4 may perform various processing steps to provide an output to output device 6 and to make logical determinations with respect to temperature, change in temperature, rate of change of temperature, and fire detection as discussed herein. Sensors 10 and/or controller 4 may perform rolling average calculations, for example to detect momentary temperature excursions or to detect a slight increase over time in temperature wherein the temperature may remain within an acceptable range, but may increase over time, for example, indicating the progressive wear of a component, such as an axle or bearing. In this manner, sensors 10 and controller 4 may operate to provide maintenance alerts and/or early detection of failing components via an alert provided at output device 6.

While sensors 10 may provide an IR level to the sensor bus 8 for delivery to controller 4; sensors 10 may also process the sensor data, for example, by an onboard processor and tangible non-transitory memory. The sensor 10 may thus provide processed data, for example, the sensor 10 may transmit messages indicative of the presence of normal temperature, elevated temperature, fire, and/or sensor faults. In some embodiments, sensors 10 do not provide IR level data to the sensor bus 8, but provide only processed data, although in some embodiments, sensor 10 provide both, or may provide only IR level data, or processed data.

With continuing reference to FIG. 1, the sensor 10 may receive infrared radiation 14 from a location under observation 12. For example, a sensor 10-1 may receive infrared radiation 14-1 from a location under observation 12-1, a sensor 10-2 may receive infrared radiation 14-2 from a location under observation 12-1, and any number of sensor 10-*n* may receive any number of infrared radiation 14-*n* from any number of location under observation 12-*n*. Infrared radiation 14 may comprise radiant energy indicating a temperature of location under observation 12. Thus, sensor 10 may not be in mechanical contact with location under observation 12, but may be separated by a distance from a location under observation 12. Similarly, sensor 10 may not need a shape corresponding to the location under observation 12, but may be of any shape.

The location under observation 12 may comprise an aircraft engine component. For example, the location under observation 12 may comprise a bleed air duct, a bearing, a shaft, a combustion chamber, a compressor, or any other component wherein heat may be generated or wherein fire may be hazardous. Similarly, the location under observation 12 may comprise a pump, a fluid, a brake component, or any other system or apparatus.

The location under observation 12 may comprise a bleed air duct of an engine. Moreover, the overheat sensor system 100 may be configured to detect various different events. A sensor 10 may receive infrared radiation 14 from a location under observation 12, for example, a bleed air duct, and controller 4 may process various inputs from sensor 10 and optionally other sources, providing output to output device 6 indicative of various events. The sensor 10 may be configured to detect an event wherein the bleed air duct bursts, so that high temperature air escapes through the burst duct. The overheat sensor system 100 may be configured to detect a bleed air leak, wherein the escape of high temperature air through a bleed air duct (location under observation 12) is gradual.

Figure 4:
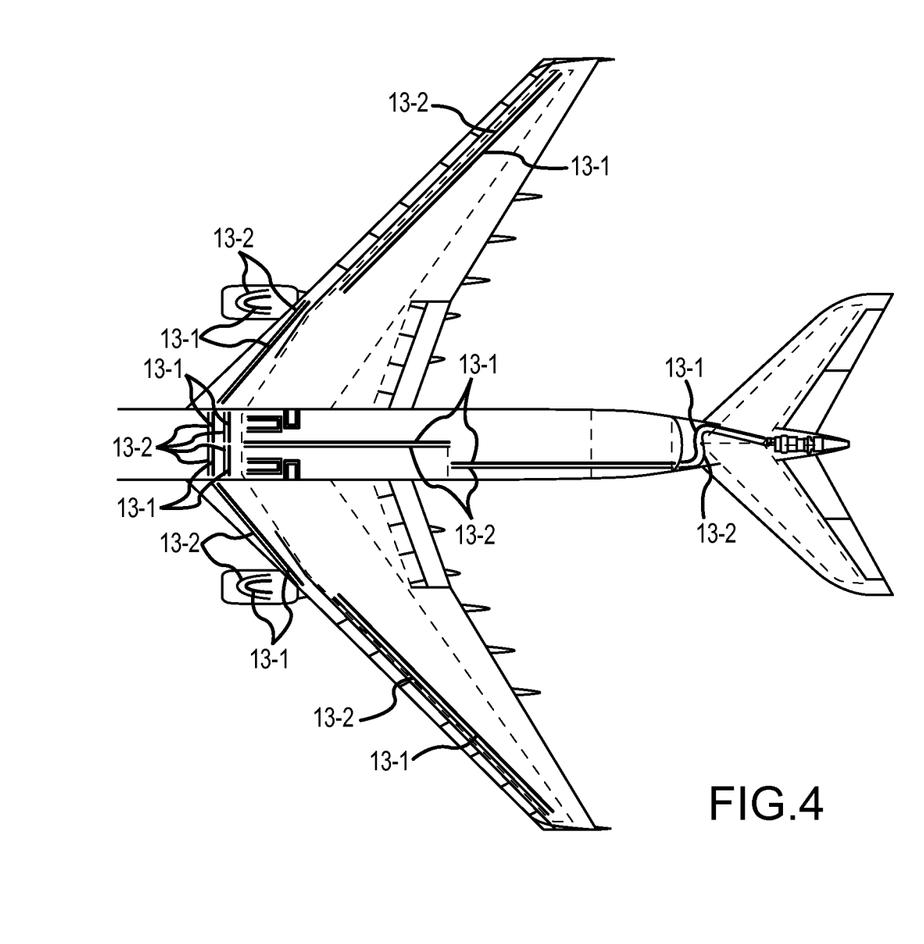
FIG. 4 illustrates various aspects of an aircraft bleed air distribution system and various aspects of an overheat sensor system installed in an aircraft.

Having discussed various aspects of an overheat sensor system 100, with reference to FIGS. 3 and 4, an overheat sensor system 100 may be implemented on an aircraft. For example, an aircraft 50 may comprise an overheat sensor system 100 (FIG. 1). An output device 6 may be positioned in the aircraft cockpit and provide human-readable output to aircraft crewmembers. A controller 4 may be installed onboard the aircraft 50 and in electrical, optical, and/or radio frequency communication with output device 6 and sensors 10, for example sensor 10-1 and sensor 10-2. In various embodiments, sensor 10-1 is installed in a first engine and sensor 10-2 is installed in a corresponding portion of a second engine. Various sensors, for example sensor 10-1, 10-2, or 10-*n* or any number of sensors 10 may be located along the bleed air ducts 13-1 and 13-2. In various embodiments, bleed air ducts 13-1 and 13-2 may run along the top center of the fuselage and/or along the wings, and/or any other location, for example, as illustrated in FIG. 4.

Sensor 10-1 and sensor 10-2 may be installed in different configurations. Sensor 10-1 and sensor 10-2 may be installed in different portions of the same engine and/or bleed air system and/or other system. Sensor 10-1 and sensor 10-2 may be installed in similar portions of the same engine and/or bleed air system and/or other system. For example, sensor 10-1 may comprise an acoustical sensor element and sensor 10-2 may comprise a temperature-sensing element. Both may be positioned proximate to an aircraft bleed air duct (location under observation 12-2). In this manner, the sensor 10-2 comprising a temperature sensing element may monitor the temperature of the bleed air duct, and in the event that the duct fragments, or otherwise so that debris impedes the transmission of infrared radiation 14-2 to the sensor 10-2, the sensor 10-1 comprising an acoustical sensor element may provide redundancy by indicating that an event of interest has occurred.

In various embodiments, an overheat sensor system 100 may operate according to various methods. For example, with reference to FIG. 2, various methods are disclosed for processing the sensor data and the avionics input data. A controller 4 may have different modes. For example, a controller 4 may have a calibration mode and an operation mode. A calibration mode may comprise a mode in which the overheat sensor system 100 creates a temperature profile of an aircraft 50 based on the sensor data and avionics input data 2. In this manner, the overheat sensor system 100 may create multiple temperature profiles corresponding to different modes of flight in response to the avionics input data 2. Thus, with reference to FIG. 2, a controller mode may be set (step 201) to a mode comprising a calibration mode. The controller 4 may then receive the aircraft mode (step 203) from the avionics 3 via avionics input data 2, or may receive the aircraft mode from non-transitory tangible memory, having previously stored the mode in response to avionics input data 2.

Figure 2:
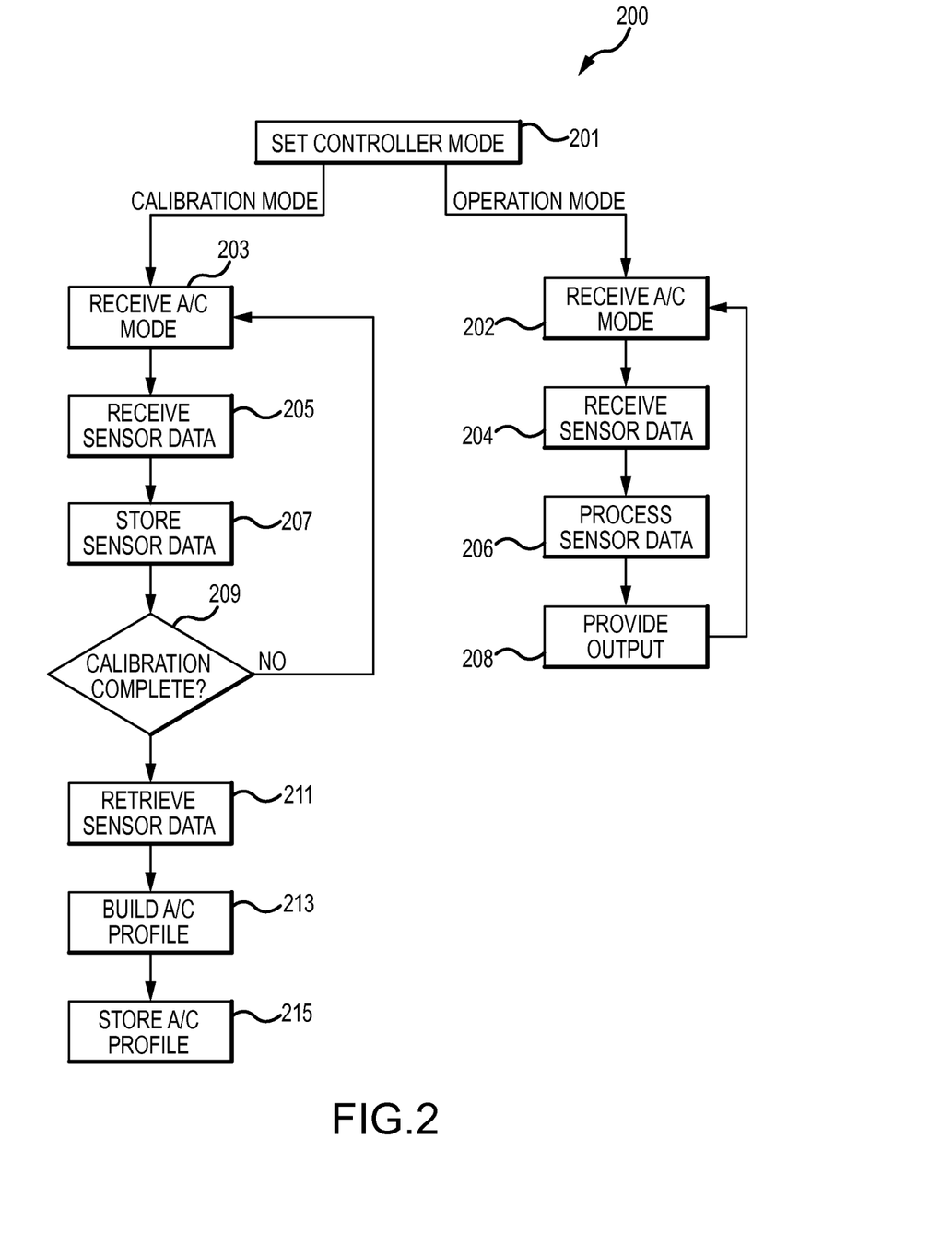
FIG. 2 depicts a flowchart illustrating various methods employed by an infrared overheat sensor system.

The controller 4 may then receive sensor data (step 205) from one or more sensor 10 via the sensor bus 8. The controller 4 may then store the sensor data in non-transitory tangible memory (step 207). If the controller 4 does not receive an indication that calibration is complete, (step 209), the controller 4 may return to step 203. If the controller 4 does receive an indication that calibration is complete, (step 209) the controller 4 proceeds to retrieve the stored sensor data (step 211) and builds an aircraft profile in response to the stored sensor data (step 213). The aircraft profile may comprise different threshold values for different sensors. For example, a first sensor 10-1 may have a first threshold and a second sensor 10-2 may have a second threshold. Thus, an aircraft profile may contain different sensed characteristics of different aircraft zones in different modes of flight. Finally, the aircraft profile is stored (step 215) for later utilization during the operation mode.

An overheat sensor system 100 may operate in an operation mode. An operation mode may comprise a mode in which the overheat sensor system 100 utilizes previously created temperature profiles to evaluate the temperature of various aircraft systems (devices under observation 12). A controller 4 may be set (step 201) to a mode comprising an operation mode. The controller 4 may then retrieve the aircraft mode (step 202) from the avionics 3 via avionics input data 2, or may retrieve the aircraft mode from non-transitory tangible memory, having previously stored the mode in response to avionics input data 2. The controller 4 may then receive sensor data (step 205) from one or more sensor 10 via the sensor bus 8. The controller 4 may then process the sensor data (step 206) and provide output in response to the processing (step 208). Then, the overheat sensor system 100 may return to step 202 and continue for as long as the controller mode is the operation mode.

Processing sensor data (step 206) comprises various algorithms and routines. As discussed herein, data may be collected from sensors 10. This data may be compared to threshold values and threshold rates of change to evaluate the temperature of any location under observation 12. Different sensors 10 may have different thresholds. For example, a first sensor 10-1 may have a first threshold and a second sensor 10-2 may have a second threshold. Different actions can also be taken in response to the different sensors 10 exceeding the different thresholds. In various embodiments, processing sensor data further comprises comparing the temperature of the location under observation 12 and/or the rate of change of the temperature of the location under observation 12 to that stored during step 215. In other words, the temperature data may be compared to the aircraft profile. Output may be provided in step 208 in response to this comparing aspect of the processing step.

With reference to FIGS. 1-3, the overheat sensor system 100 may operate according to a method implementing both the calibration mode and the operation mode of the controller 4 discussed above. For example, the controller 4 may receive an indication to set a controller mode to a calibration mode. The controller 4 may then receive an aircraft mode, a first sensor temperature indication and a second sensor temperature indication. For example, a first sensor 10-1 and a second sensor 10-2 may provide the first sensor temperature indication and the second sensor temperature indication respectively. Subsequently, and as discussed above, the controller may build an aircraft profile comprising the first sensor temperature indication, the second sensor temperature indication, and the aircraft mode.

The controller 4 may then receive an indication to set a controller mode to an operation mode. The controller may then receive an aircraft mode, a third sensor temperature indication, and a fourth sensor temperature indication. For example, the first sensor 10-1 and the second sensor 10-2 may provide the third sensor temperature indication and the fourth sensor temperature indication respectively. The controller 4 may process the third sensor temperature indication and the fourth sensor temperature indication. This processing may comprise comparing the third sensor temperature indication and the aircraft mode to the aircraft profile and comparing the fourth sensor temperature indication and the aircraft mode to the aircraft profile. An output may be provided by output device 6 in response to the processing.

A controller 4 may operate according to the operation and calibration modes at various times. For example, following maintenance and/or replacement of aircraft components, the controller 4 may be set to a calibration mode so that an aircraft profile may be built accounting for changes in nominal operating temperatures resulting from the maintenance and/or replacement of aircraft components.

While the infrared overheat sensor systems herein have been described in the context of aircraft bleed air duct applications and aircraft engine component applications, the system may be used in a variety of exemplary scenarios. For example, the system may be implemented to monitor temperature of various systems such as nitrogen systems, for example, those used to inert fuel tanks. The system may be implemented to monitor temperatures of inflight entertainment system components, trash compactors and/or incinerators, battery boxes, and other systems. The infrared overheat sensor systems herein may be implemented for wheel well fire detection and for monitoring cargo stowage areas (such as those commonly termed, "doghouses"). The infrared overheat sensor systems herein may be implemented with supplemental type certificate ("STC") modifications and non-original aircraft systems. Thus, as one may appreciate, the infrared overheat sensor systems herein may be implemented in any context in which temperature sensing is desired.

While the infrared overheat sensor systems described herein have been described in the context of aircraft applications; however, one will appreciate in light of the present disclosure, that the system described herein may be used in connection with various other vehicles, for example, cars, trucks, busses, trains, boats, and submersible vehicles, or in industrial processes, such as manufacturing, or power generation, food preparation, metal working, or any other vehicle or device in which temperature monitoring is desirable, for example, bearing systems.

An overheat sensor system 100 may include built-in testing logic. Built-in testing logic may comprise logic to perform certain tests (i.e., diagnostics) to determine whether the infrared overheat sensor systems is in a malfunctioning state. Built-in testing logic may reside in a sensor 10 or a processor, such as controller 4, or an output device 6, or any other component of an overheat sensor system 100 or other system in communication with the overheat sensor system 100. Built-in testing logic may also include safety features that use avionics input data 2 to verify that the system is in condition for operation.

As used herein, the meaning of the term "non-transitory computer-readable medium" should be construed to exclude only those types of transitory computer-readable media which were found in *In re Nuijten,* 500 F.3d 1346 (Fed. Cir. 2007) to fall outside the scope of patentable subject matter under 35 U.S.C. §101, so long as and to the extent *In re Nuijten* remains binding authority in the U.S. federal courts and is not overruled by a future case or statute. Stated another way, the term "computer-readable medium" should be construed in a manner that is as broad as legally permissible.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An overheat sensor system comprising:
    a controller comprising a processor and a tangible, non-transitory memory;
    a sensor bus in logical communication with the controller; and
    a first sensor in logical communication with the controller via the sensor bus and configured to receive first infrared radiation from a first location under observation;
    a second sensor comprising an acoustical sensor in logical communication with the controller via the sensor bus and configured to detect flying debris capable of impeding the operation of the first sensor; and
    avionics comprising an aircraft data bus whereby avionics input data indicating a mode of flight is provided to the controller,
    wherein the controller is configured to take a first action in response to the mode of flight and a first indication that the first infrared radiation from the first location exceeds a first threshold corresponding to the mode of flight, and
    wherein the first sensor comprises a temperature-sensing element configured to detect infrared radiation with a wavelength between 700 nm and 1 mm and a fire-sensing element configured to detect infrared radiation with a wavelength less than that of the temperature-sensing element, whereby each is configured to detect the first infrared radiation from the first location.

2. The overheat sensor system according to claim 1, wherein the first sensor comprises a temperature-sensing element configured to detect the first infrared radiation from the first location.

3. The overheat sensor system according to claim 1, further comprising:
    a third sensor in logical communication with the controller via the sensor bus and configured to receive a second infrared radiation from a second location under observation,
    wherein the overheat sensor system is installed in an aircraft,
    wherein the controller is configured to take a second action in response to a second indication that the second infrared radiation from the second location exceeds a second threshold.

4. The overheat sensor system according to claim 3, further comprising:
    an output device comprising a panel located in a cockpit of the aircraft;
    wherein the panel is configured to display a graphical depiction of the aircraft having a first zone and a second zone corresponding to the first location and the second location,
    wherein the first zone may display a first color in response to the first action; and wherein the second zone may display a second color in response to the second action.

5. The overheat sensor system according to claim 1, comprising an output device comprising a non-transitory, tangible memory.

6. A method for overheat sensing comprising:
    toggling, by an overheat sensing controller, a controller mode to a calibration mode wherein the calibration mode comprises:
        receiving, by the overheat sensing controller, an aircraft mode;
        receiving, by the overheat sensing controller, a first sensor temperature indication;
        receiving, by the overheat sensing controller, a second sensor temperature indication;
        building, by the overheat sensing controller, an aircraft profile comprising:
            the first sensor temperature indication;
            the second sensor temperature indication; and
            the aircraft mode;
    toggling, by the overheat sensing controller, the controller mode to an operation mode wherein the operation mode comprises:
        receiving, by the overheat sensing controller, the aircraft mode;
        receiving, by the overheat sensing controller, a third sensor temperature indication;
        receiving, by the overheat sensing controller, a fourth sensor temperature indication;
        processing, by the overheat sensing controller, the third sensor temperature indication and the fourth sensor temperature indication, wherein the processing comprises:
            comparing, by the overheat sensing controller, the third sensor temperature indication and the aircraft mode to the aircraft profile;
            comparing, by the overheat sensing controller, the fourth sensor temperature indication and the aircraft mode to the aircraft profile; and
    providing an output to an output device in response to the processing.

7. The method for overheat sensing according to claim 6, wherein the aircraft profile further comprises a first rate of change of the first sensor temperature indication and a second rate of change of the second sensor temperature indication.

8. The method for overheat sensing according to claim 6, wherein the receiving the first sensor temperature indication is in response to polling a first sensor.

9. The method for overheat sensing according to claim 6, wherein the receiving the second sensor temperature indication is in response to polling a second sensor.

10. The method for overheat sensing according to claim 6, wherein the output device comprises a fire extinguisher system and further comprising triggering the fire extinguisher system in response to the output.

* * * * *